United States Patent [19]
Kaeser et al.

[11] Patent Number: 5,518,744
[45] Date of Patent: May 21, 1996

[54] PACKAGED FOOD COMBINATION WITH EDIBLE FATTY BARRIER

[75] Inventors: Beat Kaeser, Rotkreuz; Charles Weber, Luzern, both of Switzerland

[73] Assignee: Multiforsa AG, Steinhausen/Zug, Switzerland

[21] Appl. No.: 364,382

[22] Filed: Dec. 23, 1994

Related U.S. Application Data

[63] Continuation of Ser. No. 13,044, Feb. 4, 1993, abandoned, which is a continuation-in-part of Ser. No. 986,387, Dec. 7, 1992, abandoned.

[30] Foreign Application Priority Data

May 25, 1992 [CH] Switzerland ............... 01680/92

[51] Int. Cl.$^6$ ............... B65D 85/72; B65B 29/10
[52] U.S. Cl. ............... 426/90; 426/94; 426/99; 426/106; 426/115; 426/130
[58] Field of Search ............... 426/138, 120, 426/106, 94, 90, 89, 93, 130, 99, 115

[56] References Cited

U.S. PATENT DOCUMENTS

| | | | |
|---|---|---|---|
| 2,170,155 | 8/1939 | Musher | 426/93 |
| 2,279,203 | 4/1942 | Musher . | |
| 3,031,309 | 4/1962 | Bogner et al. | 426/94 |
| 3,411,921 | 11/1968 | Shifriri | 426/130 |
| 3,484,250 | 12/1969 | Voilink et al. | 426/93 |
| 3,552,980 | 1/1971 | Cooper et al. | 426/90 |
| 3,582,336 | 6/1971 | Rasmussorf | 426/93 |
| 3,615,592 | 10/1971 | Peterson | 426/93 |
| 3,667,963 | 6/1972 | Katter et al. | 426/94 |
| 3,681,094 | 8/1972 | Rogers et al. | 426/90 |
| 4,066,796 | 1/1978 | McKee | 426/94 |
| 4,233,325 | 11/1980 | Slangari et al. | 426/120 |
| 4,293,572 | 10/1981 | Silva et al. | 426/94 |
| 4,401,681 | 8/1983 | Dahle | 426/94 |
| 4,661,359 | 4/1987 | Seaborne et al. | 426/138 |
| 4,820,533 | 4/1989 | Seaborne | 426/90 |
| 4,874,618 | 10/1989 | Seaborne et al. | 426/90 |
| 4,898,740 | 2/1990 | Havenstein et al. | 426/90 |
| 4,915,971 | 4/1990 | Fennema et al. | 426/138 |
| 4,952,414 | 8/1990 | Kaufman et al. | 426/93 |
| 4,957,754 | 9/1990 | Munk et al. | 426/138 |
| 5,130,150 | 7/1992 | Averbach | 426/94 |

FOREIGN PATENT DOCUMENTS

| | | | |
|---|---|---|---|
| 0002037 | 5/1979 | European Pat. Off. . | |
| 2728940 | 1/1979 | Germany | 426/120 |

OTHER PUBLICATIONS

Food Technology Dec. 1986 p. 47 Plus.
J. of Food Service vol. 50, 1985 p. 382 Plus.

*Primary Examiner*—Steven Weinstein
*Attorney, Agent, or Firm*—Oblon, Spivak, McClelland, Maier & Neustadt

[57] ABSTRACT

Combination of at least two different food components for consumption in the freshly mixed state and packed in a sealable beaker or cup, comprising an aqueous, creamy or pasty fresh milk product and a hydrophilic, granular or flake-like dry cereal product. Both the aqueous fresh milk product and the hydrophilic dry cereal product are packed in the same cup. A premature softening of the dry cereal product is prevented by a hydrophobic fat barrier between the fresh milk product and the dry cereal product.

8 Claims, 2 Drawing Sheets

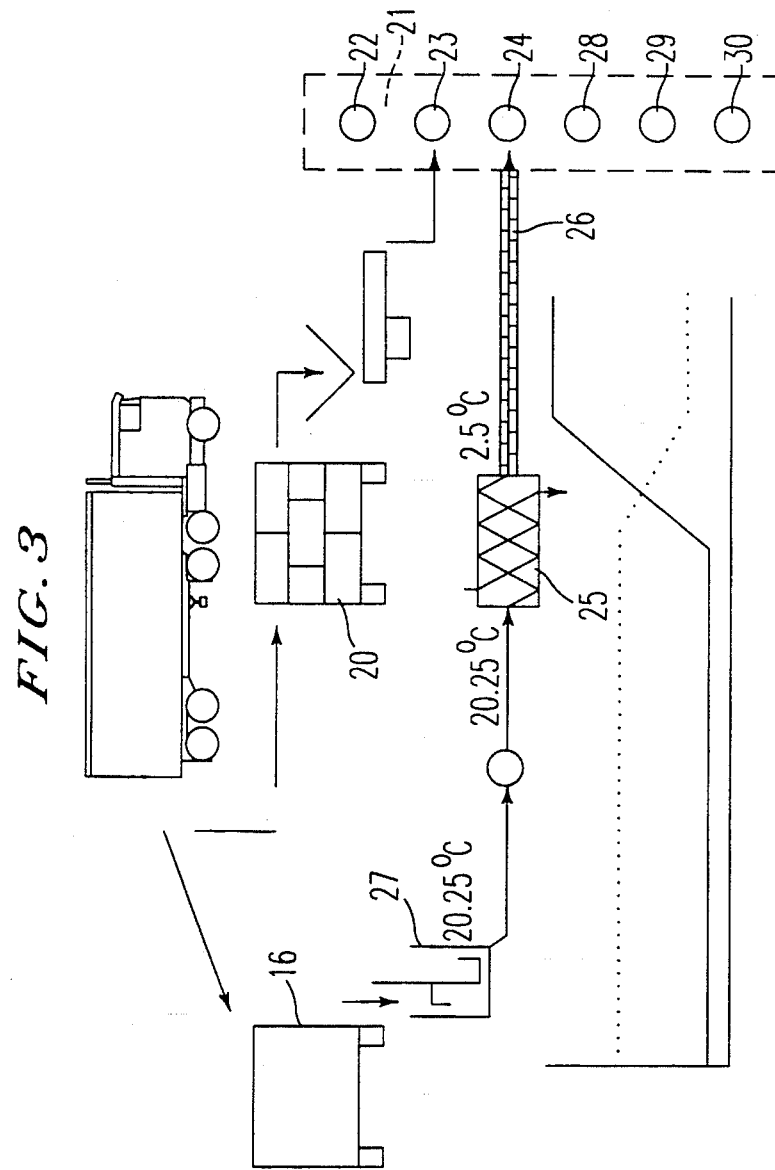
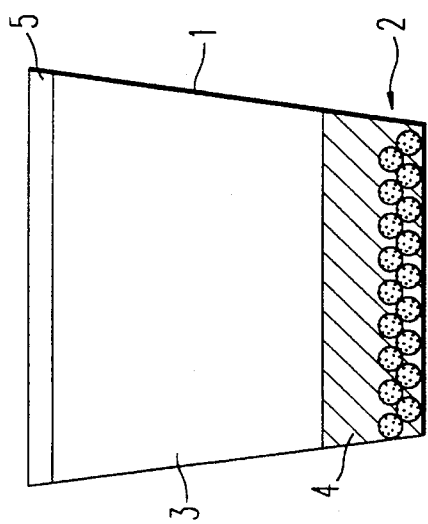

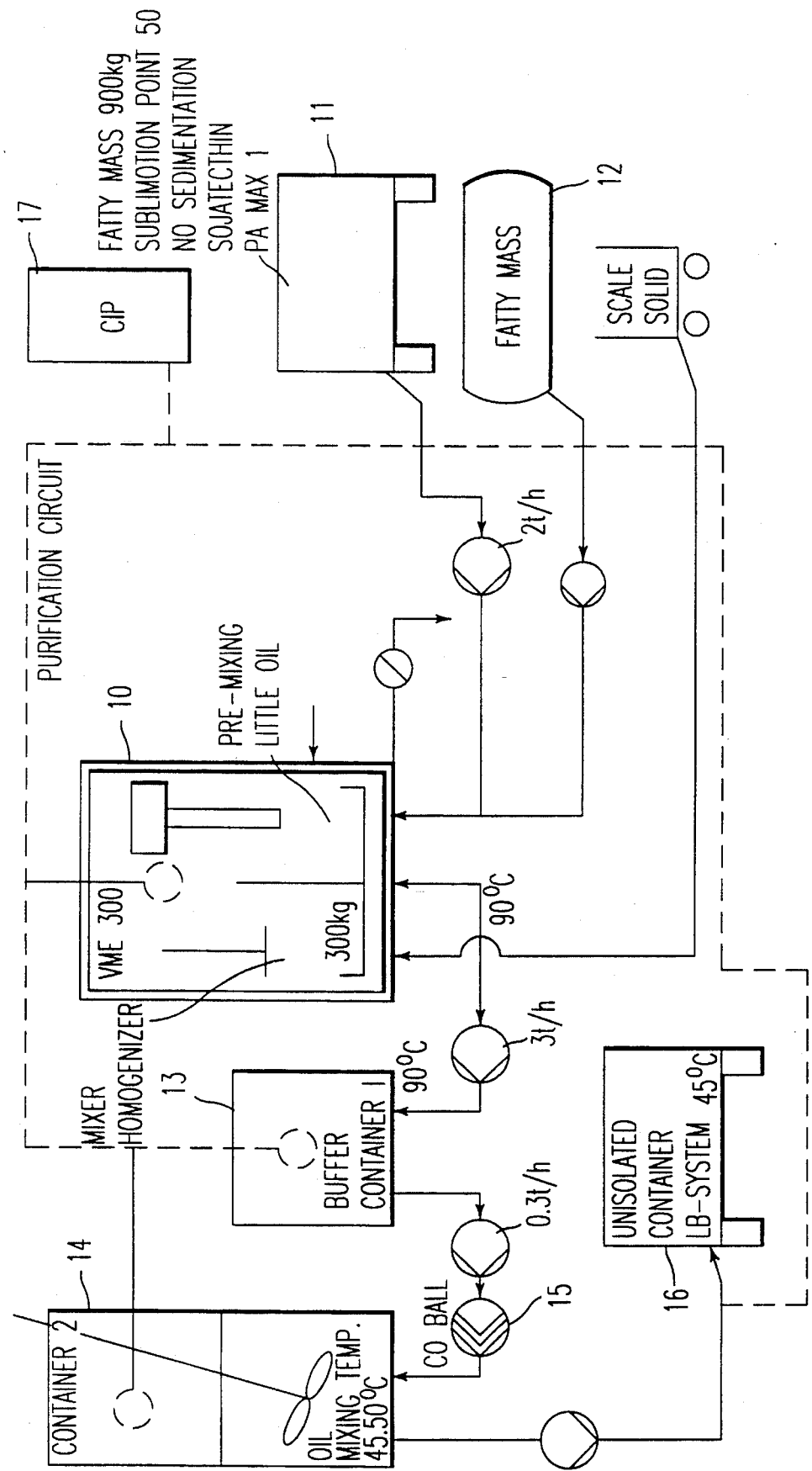

PACKAGED FOOD COMBINATION WITH EDIBLE FATTY BARRIER

This application is a continuation of application Ser. No. 08/013,044, filed on Feb. 4, 1993, now abandoned, which is a CIP of application Ser. No. 07/986,387, filed on Dec. 7, 1992, now abandoned.

TECHNICAL FIELD

The present invention relates to a combination of at least two different food components intended for consumption in a freshly mixed state and packed in a sealable cup or beaker, comprising an aqueous, creamy or pasty fresh milk product, as well as a hydrophilic, granular or flake-like dry cereal product.

PRIOR ART

Food combinations of this type are known, in which the fresh milk product is in particular yoghurt and the dry cereal product is in particular a muesli mixture. In order to prevent that the highly hydrophilic dry cereal product softens as a result of premature contact with the aqueous fresh milk product resulting in the loss of certain of its standard properties desired during consumption, the two components are packed in different containers, to the extent that prepreparation is possible in connection with the composition thereof. Thus, e.g. plastics material packs are known having two hanging together chambers closed by a common metal foil for on the one hand the aqueous milk product and on the other the dry cereal product. After removing the joint protective or closing foil the chamber containing the dry product can be emptied by tipping into the chamber containing the milk product and the resulting mixture, optionally following additional stirring, can then be eaten.

Although this type of pack guarantees that the dry cereal product is still crisp at the time of consumption and that bacteria contained therein cannot impair the long life characteristics of the fresh milk product, said known packing type is very complicated and somewhat cumbersome as regards handling at the time of consumption. It also does not permit the use of multiply usable glass cups. The known pack must in fact be disposed of with the domestic refuse.

REPRESENTATION OF THE INVENTION

The problem of the invention is to provide a combination of the aforementioned type, which is packed in a less complicated, more environmentally friendly and more easily handlable manner. This problem is solved by the characterizing part of claim 1.

Thus, according to the invention, both the aqueous fresh milk product and the hydrophilic dry cereal product are packed in the same cup or beaker and a premature softening of the dry cereal product is prevented by a hydrophobic fat barrier between the fresh milk product and the dry cereal product.

Preferred further developments of the invention are characterized by the dependent claims.

Thus, e.g. the fat barrier is preferably formed by a fat or oil-containing mass, which is creamy throughout the temperature range between approximately 5° and approximately 20° C. (consumption range). Within the said temperature range the viscosity temperature curve of said mass should be as flat as possible. At least at 5° C. the mass used should have a viscosity below 40,000 centipoise and at 20° C. a viscosity higher than 5,000 centipoise. If the viscosity is too low, i.e the creamy mass is too liquid, there is a risk that the light grains or flakes of the dry cereal product will float in the mass and therefore come into contact with the fresh milk product. If the viscosity is too low there is a risk of an intermixing of the two components which should be kept separate if the cup is moved or shaken, which naturally occurs during transportation. If the viscosity is too high, i.e. the stiffness is excessive, there is a risk of there possibly being no hermetically closed layer between the two components at the time of filling. For pleasant consumption reasons an excessive stiffness of the mass is undesired. The desired viscosity and desired temperature variation for the viscosity can be adjusted by an appropriate choice of the components used for the mass forming the fat barrier. Thus, it is possible to mix fats and oils having different characteristics and temperature curves for their viscosities. It is also possible to use crystallization retarding agents for the fats.

Preferably, the fresh dairy product which contains water and the hydrophilic dry cereal product are arranged such that they are separated from one another in different regions of the container by means of the fat barrier. If the dry cereal product is arranged at the bottom of the container, and the fresh dairy product is arranged at the top of the container, then part of the mass which forms the fat barrier will penetrate cavities in the dry cereal product layer when it is filled into the container, causing a certain mixing of the said mass with the dry cereal product. This is not harmful and can in fact be desirable if a sufficiently thick fat layer or barrier which does not contain any dry cereal product remains above the dry cereal product as a separating layer. In the case of containers which hold approximately 2 deciliters, a thickness of approximately 2–3 mm is generally sufficient for the separating layer.

The dry cereal product should not be mixed with the mass intended to act as the fat barrier before being filled into the container, because individual grains or flakes of the dry cereal product then come to rest on the border surface between the fat layers and the fresh dairy product which contains water. These grains or flakes absorb moisture and can act as a wick, passing this moisture on to the grains/flakes which are embedded further down in the mass containing fat or oil and even further under certain circumstances. If the dry cereal product is arranged at the top of the container, i.e. is filled in on top of the fat barrier which was previously placed in the container and which covers the fresh dairy product, practically no mixing of the dry cereal product with the mass forming the fat barrier will take place. If the dry cereal product is arranged in the top part of the container, the problem of floating of the cereal grains into the mass containing fat or oil is avoided, at least as long as the container is not placed upside down.

As in the known combinations the fresh milk product can in particular by yoghurt, but also curdled milk, quark, ice cream, dessert cream, blanamange, etc. The dry cereal product can in particular be in the form of crispies or a muesli mixture. Crispies are an extruded product formed from wheat and further raw materials such as in particular sugar, salt and starch.

When using crispies their protection against moisture absorption and softening can be further improved by a thin chocolate coating of the individual granules.

The fat or oil-containing mass forming the fat barrier can advantageously be provided by corresponding flavouring additives with a desired taste component, e.g. a fruit, chocolate or nut taste. In total, the fat or oil-containing mass should contain at least a 70% by weight of fat or oil, and be as free of water as possible. Also, no emulsifiers should be used, because these materials can form bridges between fat molecules and water molecules.

The fat barrier also protects not only the dry cereal product against an undesired moisture absorption and softening, but also ensures that the germs contained in the cereal product do not come into contact with the fresh milk product, so as to lead to its premature spoiling. This is an important prerequisite for the possibility of packing within the same cup or beaker a fresh milk product and a dry cereal product. However, for safety reasons, it should be ensured that the dry cereal product is as sterile as possible.

BRIEF DESCRIPTION OF THE DRAWINGS

Embodiments of the invention are described in greater detail hereinafter relative to the drawings, wherein show:

FIG. 1 A sectional representation of a cup filled with crispies, yoghurt and a fatty mass for separating these components.

FIG. 2 A diagram of a preferred production sequence for a fat or oil-containing mass suitable as a fat barrier.

FIG. 3 A further diagram of a preferred production sequence for the automatic filling of cups according to FIG. 1.

WAY OF IMPLEMENTING THE INVENTION

The cup or beaker 1 shown in FIG. 1 is filled in layer form. The bottom layer 2 consists of crispies. The top layer 3 consists of yoghurt. Between the aqueous yoghurt layer and the moisture-sensitive crispies is provided as a separating layer a fat barrier 4. The fat barrier consists of a creamy, fat or oil-containing mass. Whereas there is a relatively clear separation between the yoghurt and the layer forming the fat barrier, this is not the case with respect to the transition between the latter and the crispy layer 2. Cavities between the individual crispy granules are in fact filled by the mass forming the fat barrier. It is not prejudicial and can even be advantageous if the crispy granules are completely embedded in the mass forming the fat barrier and are individually completely surrounded by it. The extent to which one or other applies is decisively dependent on the procedure used when filling the cup 1. All that is important is that there is no contact in a direct from between the crispies and the yoghurt.

With reference to FIG. 2 an automatable production process for the mass forming the fat barrier will now be explained. FIG. 2 shows a first container 10, which is filled with different fatty masses or oils, as well as with solids (roughly in a 50:50 ratio). The fatty masses are e.g. either (in container 11) a mixture of partly hydrated rape oil and sunflower oil (optionally with a wheat germ oil addition) or (in tank 12) partly hydrated vegetable fat. Both rape and sunflower oil are admittedly liquid at temperatures above 0° C., but become relatively viscous through partial hydration (i.e. the cleaving of double bonds). The solids are in particular crystalline sugar, as well as flavours, such as e.g. cocoa powder, hazelnut paste (whole finely ground hazelnuts) or some other suitable paste.

The aforementioned components are physically intermixed by stirring in the container 10. The expression "physically" relates to the crystalline sugar, because the latter does not dissolve in the fat or oil mass. Within the container 10 there is also a pasteurization of the mass (10 minutes at a temperature of approximately 90° C.) or preferably a sterilization thereof (1 minute at 120° C.).

From the container 10 the viscous mass is pumped by means of a buffer container 13 into a receiving container 14 and is rediluted there, accompanied by stirring, with cold oil (20° C.). For the redilution more than 50% of the total oil quantity is supplied. Between the buffer container 13 and the receiving container 14 is provided a continuous ball mill, in order to ultrafine grind the crystalline sugar. After passing through the mill, the sugar crystals should not have a diameter exceeding approximately 20 μm.

The mass for the fat barrier on leaving the receiving container is filled into a transportation container 16, in which it can e.g. be transported to a dairy or creamery.

It is important, particularly after pasteurization or sterilization, that the mass is handled in an optimum sterile manner.

The entire process shown in FIG. 2 can be controlled by a central computer and therefore takes fully automatically. By means of the cleaning in place (CIP plant 17), automatic cleaning and sterilization take place.

Relative to FIG. 3 an explanation will now be given of the filling of the crispies, the mass forming the fat barrier and the yoghurt into the cup or beaker. The sequence starts with the delivery of the mass provided for the fat barrier in the aforementioned transportation container 16, as well as the crispies 20 packed e.g. in boxes or bags. The latter are firstly fed onto a conveyor belt 21 and metered into a beaker 22 moving past a filling station 23. The mass forming the fat barrier is then carefully applied to the crispies in station 24 in such a way that they are not displaced from their position on the bottom of the beaker. To ensure that the crispies cannot float into the fat or oil-containing mass applied above them, said mass must not be too liquid. It must therefore be cooled immediately prior to filling and for this purpose the heat exchanger 25 is provided. The heat exchanger 25 can be a so-called UHT heat exchanger, in which the mass is additionally sterilized by brief heating to 120° C. prior to its cooling. It is then not necessary to make such high demands regarding the microbiological conditions during the transportation and handling of the mass. Relatively rapid cooling of the mass containing fat (within at most a few minutes) also has a positive effect on its long-term stability. This is due to the fact that with rapid cooling only small fat crystals occur, which reduces the danger of oil formation.

A thermally insulated tube 26 leads from the heat exchanger 25 to the filling station 24. The diagram in the lower part of FIG. 3 shows the temperature pattern and the viscosity of the mass on its path from the container 16 or stirrer 27 to the filling station 24. The stirrer 27 is necessary, because sedimentation takes place in the container 16. In the following stations 28 to 30 the yoghurt is dosed in, the closure foil applied and the beaker or cup hermetically sealed.

We claim:

1. A food product comprising at least two different food components and an edible fatty barrier packaged in a sealable container allowing for consumption of said food components in a freshly mixed state, wherein one food product component comprises a water-containing semi-solid fresh milk product and a second product component comprises hydrophilic dry cereal in granular or flake form, wherein the water-containing fresh milk product and the hydrophilic dry cereal product are separately disposed from each other in separate layers in separate regions of said container; said layers being on top of each other and only separated from being in physical contact with each other by said edible fatty barrier which is located between and in physical contact with both the fresh milk product and the dry cereal product such that premature softening of the dry cereal product is prevented, said edible fatty barrier consisting essentially of a hydrophobic fatty composition selected from the group consisting of one or more fats, oils or mixtures thereof, said edible fatty barrier having a viscosity that is below 40,000 centipoise at 5° C. and is higher than 5,000 centipoise at 20° C. so that said edible fatty barrier is creamy throughout the temperature range between approximately 5° C. and approximately 20° C. and so that said edible fatty barrier forms a closed water impermeable intermediate layer between said fresh milk product and said dry cereal product which prevents contact between said hydrophilic dry cereal and said fresh milk product.

2. A food product according to claim 1, wherein the dry cereal product is disposed in a lower part of the container and the fresh milk product is disposed in an upper part of the container.

3. A food product according to claim 1, wherein at least some of the granules or flakes of the dry cereal product are completely embedded in the edible fatty barrier.

4. A food product according to claim 1, wherein said edible fatty barrier contains at least 70% by weight fat and/or oil and is substantially water-free.

5. A food product according to claim 1, wherein said dry cereal product is arranged in a top part of the container and wherein said fresh dairy product is arranged in a bottom part of the container.

6. A food product according to claim 1, wherein the edible fatty barrier consists of a mixture of partially hydrated rape and sunflower oil, optionally wheat germ oil, and at least one solid selected from the group consisting of crystalline sugar, cocoa powder and hazelnut paste.

7. A food product according to claim 1, wherein the edible fatty barrier consists of partly hydrated vegetable fat and at least one solid selected from the group consisting of crystalline sugar, cocoa powder and hazelnut paste.

8. A food product consisting of two different food components and an edible fatty barrier packaged in a sealable container allowing for consumption of said food components in a freshly mixed state, wherein one food product component comprises a water-containing semi-solid fresh milk product and a second product component comprises hydrophilic dry cereal in granular or flake form, wherein the water-containing fresh milk product and the hydrophilic dry cereal product are separately disposed from each other in separate layers in separate regions of said container; said layers being on top of each other and only separated from being in physical contact with each other by said edible fatty barrier which is located between and in physical contact with both the fresh milk product and the dry cereal product such that premature softening of the dry cereal product is prevented, said edible fatty barrier consisting essentially of a hydrophobic fatty composition selected from the group consisting of one or more fats, oils or mixtures thereof, said edible fatty barrier having a viscosity that is below 40,000 centipoise at 5° C. and is higher than 5,000 centipoise at 20° C. so that said edible fatty barrier is creamy throughout the temperature range between approximately 5° C. and approximately 20° C. and so that said edible fatty barrier forms a closed water impermeable intermediate layer between said fresh milk product and said dry cereal product which prevents contact between said hydrophilic dry cereal and said fresh milk product.

* * * * *